(12) United States Patent
Talwar et al.

(10) Patent No.: US 7,912,804 B1
(45) Date of Patent: Mar. 22, 2011

(54) CHANGE MANAGEMENT IN A DISTRIBUTED SYSTEM BASED ON TRIGGERED POLICY RULES

(75) Inventors: Vanish Talwar, Palo Alto, CA (US); Chetan Shankar, Champaign, IL (US); Dejan Milojicic, Palo Alto, CA (US); Subramoniam N. Iyer, Newark, CA (US); Yuan Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 11/789,176

(22) Filed: Apr. 24, 2007

(51) Int. Cl.
*G06F 17/00* (2006.01)
*G06N 5/02* (2006.01)
(52) U.S. Cl. ......................................... 706/47
(58) Field of Classification Search .................... 706/47
See application file for complete search history.

(56) References Cited

U.S. PATENT DOCUMENTS

| | | | |
|---|---|---|---|
| 6,424,948 | B1 | 7/2002 | Dong et al. |
| 6,826,579 | B1 | 11/2004 | Leymann et al. |
| 7,137,099 | B2 | 11/2006 | Knight et al. |

OTHER PUBLICATIONS

Shankar et al. "A Policy-based Management Framework for Pervasive Systems using Axiomatized Rule Actions", in IEEE NCA05.*
Valdez et al. "Monitoring the Execution of an Intelligent Planning System", MICAI 2002, pp. 477-485.*
Shankar et al. "Specification-Enhanced Policies for Automated Management of Changes in IT Systems", LISA'06, pp. 103-118.*
McAllester et al. "Systematic Nonlinear Planning", MIT A.I. Memo 1339, 1991, pp. 1-15.*
Shankar et al. "A Policy-based Management Framework for Pervasive Systems using Axiomatized Rule Actions", in IEEE NCA, 2005, total pp. 4.*
Alferes, J. J. et al., "An Event-Condition-Action Logic Programming Language", downloaded Apr. 24, 2007.

* cited by examiner

*Primary Examiner* — Michael B. Holmes
*Assistant Examiner* — Li-Wu Chang

(57) ABSTRACT

A method for providing change management in a distributed system is provided. The method includes compiling a policy for change management in the distributed system, the policy includes at least one policy rule based on an event-condition-action (ECA) framework with a pre-condition and a post-condition to an action in the policy rule, wherein the pre-condition is separate from a condition of the policy rule and indicates a prior condition in the distributed system that enables the action, and the post-condition indicates a subsequent condition in the distributed system that results from the action; receiving at least one event indicating a change in the distributed system; determining that the at least one received event triggers the at least one policy rule; generating a workflow to manage the change in the distributed system based on the at least one triggered policy rule; and initiating one or more actuators in the distributed system to dynamically configure or deploy components in the distributed system to execute the workflow.

13 Claims, 5 Drawing Sheets

CHANGE MANAGEMENT IN A DISTRIBUTED SYSTEM BASED ON TRIGGERED POLICY RULES

BACKGROUND

Modern distributed or enterprise systems, such as enterprise information technology (IT) data centers and grid computing systems, are paradigms of distributed computing where computation and data are distributed across diverse computational and storage elements. These systems provide the compute and storage capabilities for enterprise workloads such as multi-tier applications, desktop applications, and technical computing jobs. System management within such enterprise IT systems involves tasks concerning performance management, configuration management, patch management, problem diagnosis, etc. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users.

Enterprise IT systems are being increasingly characterized by growing complexity, scale, and heterogeneity of infrastructure and applications. Further, these systems are highly dynamic and subject to frequent changes such as service plug-in/plug-out, workload variations, failures, configuration updates, and application migration. Such changes affect the runtime operation of the system, and the service contracts offered to customers. In reaction to these changes, infrastructure elements, applications, as well as system management components in these systems need to be adapted. For example, compute and storage resources may have to be re-allocated, applications may need to be restarted, and monitoring infrastructures may require re-configuration.

Current approaches used by system administrators to manage the aforementioned changes are manual and/or involve a combination of ad-hoc tools and scripts, and they typically require special expertise and detailed actions by the administrators. Consequently, the current approaches are not suitable for large distributed or enterprise systems because of the high human operational costs, broken closed-loop automation, and reduced agility that would be associated for such a large scaling. Accordingly, while the current approaches may work fine in small scale installations, they do not scale well to larger installations, such as typical modern IT systems and utility systems of tomorrow.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
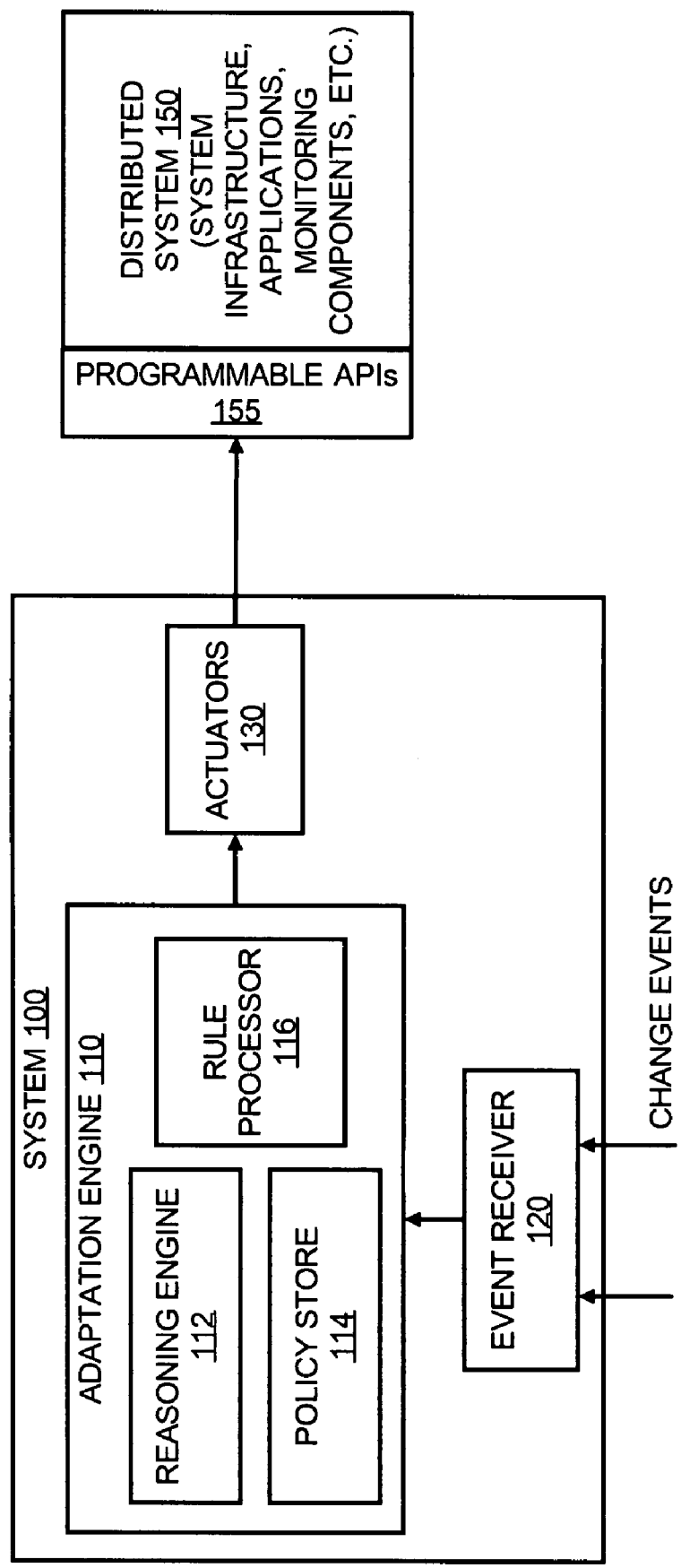
FIG. 1 illustrates a block diagram system wherein one or more embodiments may be practiced.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

In large installations typical of modern IT systems and utility systems of tomorrow, there is a desire to provide system administrators with tools that can capture the expert domain knowledge in machine readable format and thereafter react to changes in an automated manner. Policy-based management systems and policy rule-based techniques thereof have been effectively used to manage network switches, content distribution networks, and general distributed systems. For example, the use of Event-Condition-Action (ECA) rules is a well-known approach for enabling system administrators to specify the desired actions to be invoked on changes in policy rules. According to such rules, when a change event is received, the rules matching the event are determined. If the conditions in these rules are true, the corresponding actions are executed. An example of an ECA rule is "When checkpoint store is full (event), if backup store is running (condition), assign backup store as new checkpoint store (action)". In other words, when the checkpoint store becomes full, an event is sent that triggers the rule. The management system verifies if the backup store is running and if so assigns it as the new checkpoint store.

The ECA rule framework is used in different paradigms such as active databases, access control and system management to react to different situations. Active databases use the ECA framework for designing triggers that specify actions to be executed when certain database operations such as record insertion or deletion are made. Access control systems use ECA rules to authorize or deny access when an access request is made. Management systems use the ECA framework for designing obligation rules to specify management actions to be executed when system changes are observed. Rule actions in active databases and access control are normally well-defined and hence their effects on the system are implicitly known. For example, active database trigger rules normally use insert, delete and update actions while access control actions are normally authorize, deny and delegate. This enables complex reasoning such as confluence, rights-amplification and conflict analyses to be performed over these rules.

The applicability of policy-based systems for reacting to changes in enterprise IT systems, such as data centers and utility infrastructures, presents numerous challenges due to highly interdependent components in such systems. That is because the complexity of enterprise IT environments typically cause simultaneous activation of multiple policy rules, which may have to be enforced in proper order to produce an accurate final system state. Furthermore, unlike rule actions in active databases and access control, rule actions in system management are not well-defined and can range from simple atomic actions to complex scripts, and their effects on the system are not implicitly known. However, conventional ECA rules do not contain explicit action specifications needed for reasoning and are therefore unsuited for specifying management rules that provide guarantees for system behavior to be deterministic. Therefore, explicitly specifying the action effects using pre- and post-conditions enables complex reasoning to be performed over management rules.

Accordingly, described herein are methods and systems for providing automated management of changes in enterprise IT systems based on domain knowledge that is captured in machine-readable format in the form of policy rules and a developed set of techniques that use these rules to achieve system stability. Therefore, provided herein are various embodiments that cover the system architectural design, the enhanced rule framework, and the rule ordering mechanisms & enforcement semantics to achieve an automated solution for reacting to changes in enterprise IT systems and provide guarantees for system behavior to be deterministic. Such an automated solution may be provided as a set of tools or a service to the system administrators with explicit specification of action effects using pre- and post-conditions.

System

FIG. 1 illustrates an architecture framework 100 for providing an automated solution for managing changes in a distributed system 150, such as an enterprise IT system or any scalable distributed system (e.g., distributed monitoring systems), wherein an embodiment may be practiced. The framework 100 includes the following software programs, applications, or modules: an adaptation engine 110, an event receiver 120, and an actuators module 130. As referred herein, a software program, application, or module includes one or more machine-coded routines, objects, components, data structures, and the like that perform particular tasks or implement particular abstract data types. The event receiver 120 automates the reception and processing of change events and models. The adaptation engine 110 makes use of policies to automate decision making in reaction to the received change events. The actuators modules 130 includes a set of one or more actuators that access the programmable application programming interfaces (APIs) 155 in the distributed system 150 to dynamically reconfigure the system infrastructure for automated change management.

At the core of the framework 100 is the adaptation engine 110, which determines the policies and set of actions thereof that are to be taken when a change event is received. Policies are designed using ECPAP rules, which are the conventional ECA rules but with pre and post-condition extensions (hence the P's before and after the A in ECPAP). The ECPAP rules are kept in the policy store 114. When the adaptation engine 110 receives a change event via the event receiver 120, it evaluates the policies in the policy store 114 with its rule processor 116 to determine the rules matching the event, verifies the conditions in those rules with its reasoning engine 112, and finally executes the corresponding actions with its actuators 130. Because a modern distributed system 150, such as an enterprise IT system, contain interdependent components, a single change may generate multiple events triggering multiple rules. Thus, the reasoning engine 112 includes algorithms to resolve conflicts among the triggered rules and to orchestrate actions into a workflow. In turn, one or more actuators in the actuators module 130 execute the workflow to dynamically configure and deploy the infrastructure components in the distributed system 150 to manage the change event. Thus, the actuators module 130 functions as a workflow execution engine.

Figure 2:
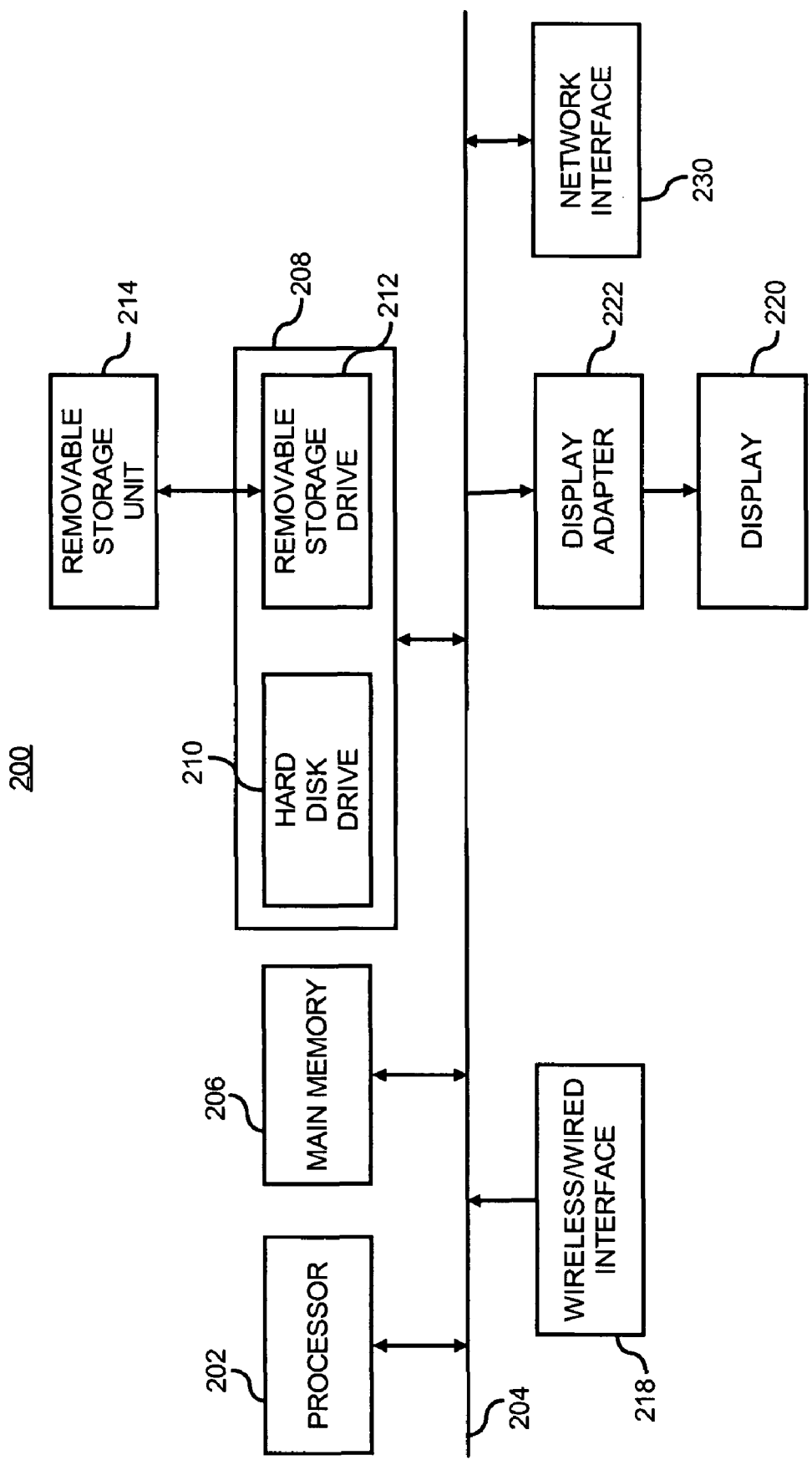
FIG. 2 illustrates a block diagram of a computerized system wherein one or more system components may be practiced, in accordance with one embodiment.

FIG. 2 illustrates a block diagram of a computerized system 200 that is operable to be used as a platform for implementing the entire architecture framework 100, or each one of the modules therein. The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store one or more of the modules in the framework 100. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

Figure 3:
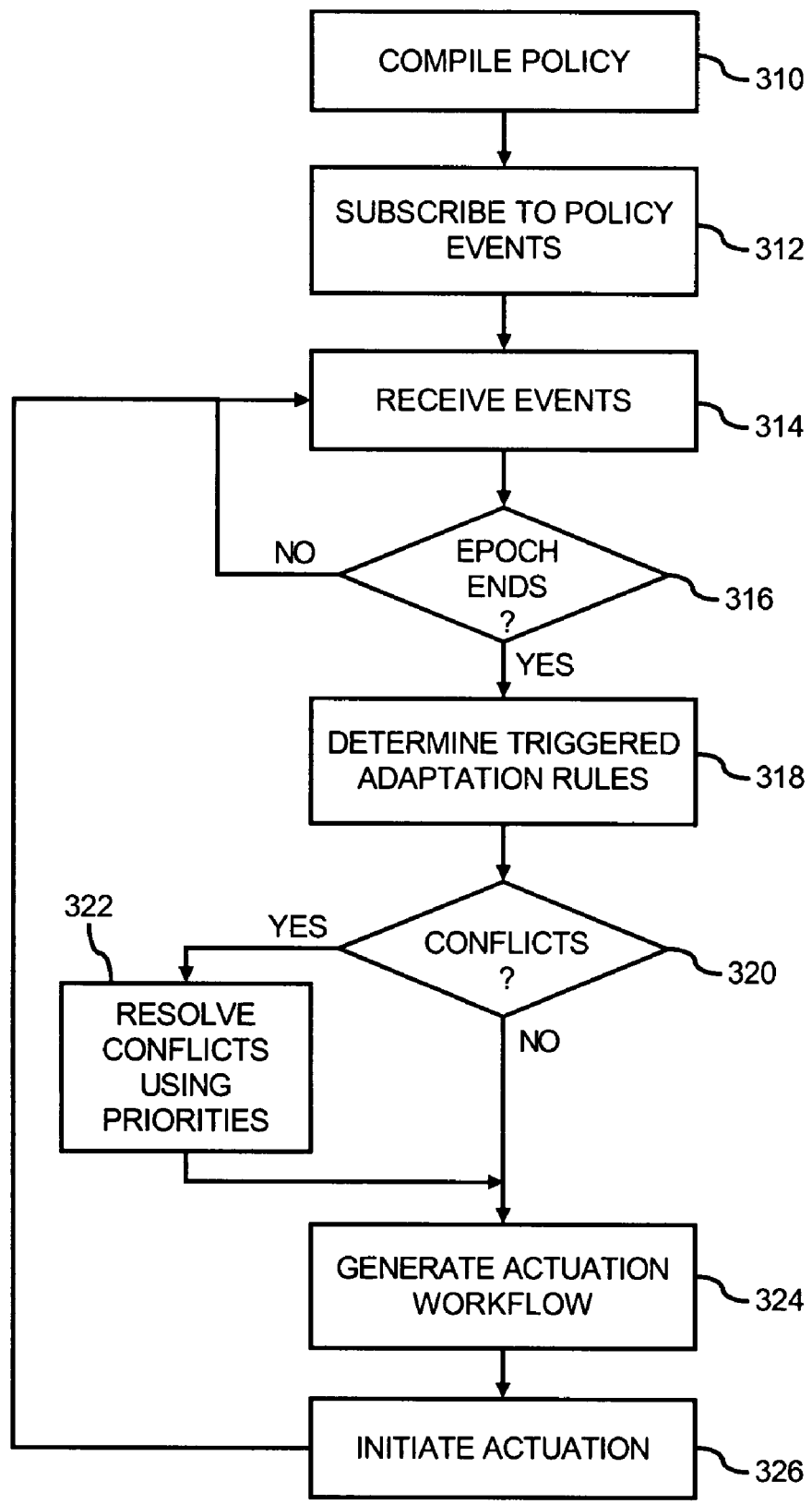
FIG. 3 illustrates a method for providing automated management of changes in a distributed system, in accordance with one embodiment.

FIG. 3 illustrates a flow chart diagram of a method 300 for providing automated management of changes in a distributed system. For illustrative purposes only and not to be limiting thereof, the method 300 is discussed in the context of the architecture framework 100 illustrated in FIG. 1.

At 310, an adaptation policy, containing the ECPAP rules, is compiled and loaded into the adaptation engine 110 of the system 100 by the system administrator. In one embodiment, the policy is complied into a policy object file, which contains rules in a format suitable for loading into the rule processor 116. The ECPAP rules and the rationale for using such rules are further described later.

At 312, the rule processor 116 subscribes to policy events (i.e., those events specified in the adaptation policy) and waits for the occurrence of such events as received by the event receiver 120.

Figure 4:
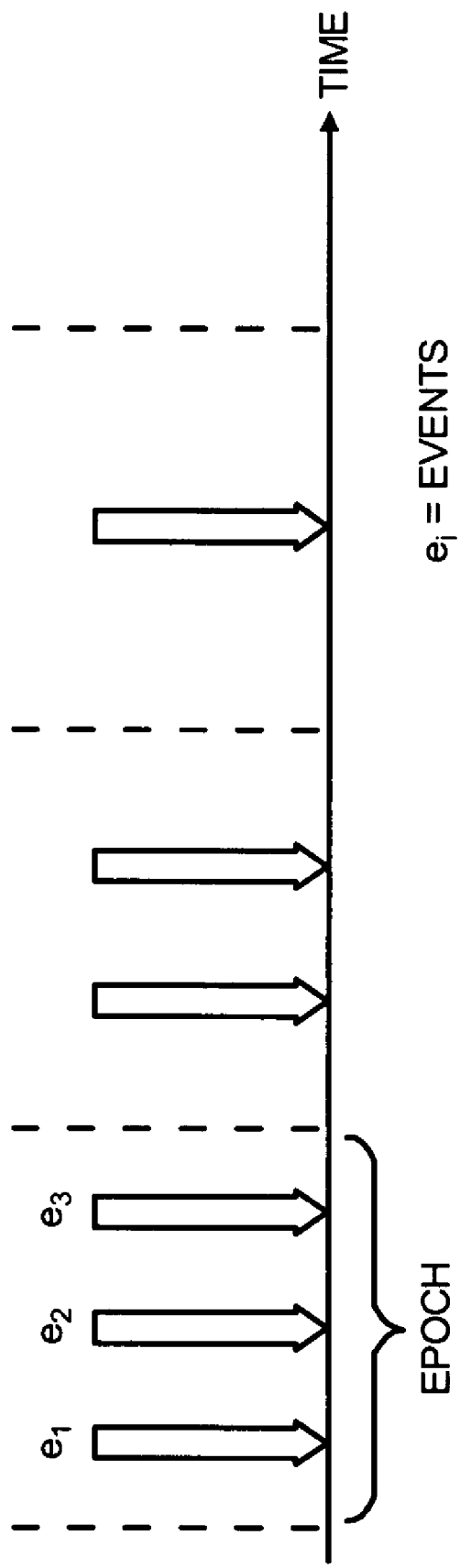
FIG. 4 illustrates an epoch model, in accordance with one embodiment.

At 314, events correlating to a change are received by the event receiver 120. Because the input to the framework 100 is a set of events, any appropriate correlation model may be employed to correlate such a set of events to a particular change in the distributed system 150 without affecting policy evaluation and enforcement. For example, in one embodiment, because a single change to the distributed system 150 may trigger more than one event occurrence, the event receiver 120 employs predefined time intervals, or epochs, to categorize the received events by epochs, with each epoch corresponding to a single change. The event correlation model for event reception based on epochs is, for example, as proposed by Chomicki et al. in "Conflict Resolution Using Logic Programming," *IEEE Transactions on Knowledge and Data Engineering, vol.* 15, *no.* 1, 2003. FIG. 4 illustrates such an epoch model, which is suitable for defining policy rules with composed events. Because a composed event normally contains events that have occurred "simultaneously" and the event receiver 120 receives events sequentially, the epoch model provides a good approximation to simultaneity.

At 316, accordingly, the event receiver 120 determines whether a current epoch has ended. If the epoch has not ended, the event receiver 120 continues to receive events until the current epoch ends.

At 318, at the end of each epoch, the rule processor 116 evaluates the policy in the policy store 114 and determines the set of rules that are triggered. The rule processor 116 supports interfaces to load policies, query the policy store for the loaded policies, and retrieve the set of actions in the action stores, e.g., in the policy store 114, for the reasoning engine 112. The retrieval of the set of actions in the action stores includes a retrieval of the pre- and post-conditions (i.e., the two P's in the ECPAP rules) associated with each of the actions. In addition, the system also supports user interfaces to list available events and actions. These interfaces are useful for designing policies.

At 320, the reasoning engine 112 checks the triggered rules for any conflicts. The reasoning engine 112 supports interfaces to load conflict resolution rules stored in, e.g., the policy store 114, and to receive the set of policy actions and associated pre- and post-conditions from the rule processor 116. Alternative embodiments are contemplated wherein the conflict resolution rules are stored in the reasoning engine 112 or another storage location different from both the reasoning engine 112 and the policy store 114. In such alternative embodiments, the reasoning engine 112 is operable to load conflict resolution rules stored therein or to support interfaces to load the conflict resolution rules wherever they are stored.

At 322, if there are conflicts between the triggered rules, the reasoning engine 112 resolves such conflicts using any known priority-based resolution technique, such as a technique provided by C. Shankar et al. in "A Policy-based Management Framework for Pervasive Systems using Axiomatized Rule Actions," *Fourth IEEE International Symposium on Network Computing and Applications (IEEE NCA05), MA,* 2005.

At 324, once there is no longer any conflict, the reasoning engine 112 proceeds to generate a workflow for the actuators module 130. In one embodiment, the reasoning engine 112 determines the enforcement order of the rules using pre-conditions and post-conditions of actions (i.e., the two P's) in the ECPAP rules, in accordance with the priorities for resolving any conflict, in order to generate a Petri net workflow representing dependencies among rule actions.

At 326, the actuators module 130 initiates the actuators in the actuators module 130 in accordance with the generated workflow.

As discussed earlier, rule actions in system management are not well-defined and can range from simple atomic actions to complex scripts, and their effects on the system are not implicitly known. Therefore, explicitly specifying the action effects using pre- and post-conditions enables complex reasoning to be performed over management rules. Accordingly, in one embodiment, the ECPAP framework for providing ECPAP rules in an adaptation policy extends the ECA framework by using the Hoare triple (C.A.R. Hoare, "An axiomatic basis for computer programming," *Communications of the ACM,* 12(10), 1969). A Hoare triple, represented as $\{P\}$ C $\{Q\}$, describes how an action C changes the state of computation from a state where P is true to a state where Q is true. P and Q, expressed as first-order predicate logic expressions, are pre- and post-conditions of C, respectively, and are called axiomatic specifications. The pre-condition specifies the system state that should exist before C can be executed. Thus, the adaptation policies are formulated as sets of ECPAP rules of the form:

on event if condition do action

Each adaptation-policy rule is read as: "when event occurs in a situation where condition is true, then execute action." The action is a call to a method in a library of actions where each action is annotated with a pre-condition and a post-condition by the action developer (programmer). Note that pre- and post-conditions are not specified as part of the rules because an action may be invoked by multiple rules in the policy and this format avoids listing the specifications at multiple places. An ECPAP rule is represented as (e, c, p)→(a, s) where e denotes the rule event, c denotes the condition of the rule, p is the pre-condition of the action, a is the action to be executed and s is the action post-condition. The evaluation of the rule and execution of the action is treated as an atomic operation, i.e., if the system state changes after the rule evaluation and before the action execution, the change is ignored.

An adaptation policy is subject to numerous changes such as addition and deletion of rules, rule modifications, and policy composition. Each rule is generally evaluated and enforced independent of other rules in the policy. When multiple rules are triggered, it was found that the order of enforcement of rules determines the system behavior. Therefore, as noted above at 324 in FIG. 3, the reasoning engine 112 implements enforcement semantics that provides certain guarantees about rule enforcement. Enforcement semantics of a policy-based adaptation system dictates the way rules are to be enforced when multiple rules are simultaneously triggered.

When a set of rules is triggered (and subsequent to any conflict resolution), the reasoning engine 112 determines the execution order of the rule actions by constructing a workflow that expresses dependencies between different actions. The pre- and post-conditions of actions determine which action enables which other actions. An action is said to enable another action if the post-condition of the former satisfies the pre-condition of the latter. The workflow of rule actions is represented as a Boolean Interpreted Petri net (BIPN), which is useful to model and reason about concurrent action execution. As understood in the art, a BIPN is a Petri net whose transitions are assigned Boolean functions. A transition can fire only when all of its input places are marked, and its Boolean function is true. In one embodiment, a place is assigned to each action, and each transition leading to the place is assigned the pre-condition of the action as the Boolean function. The reasoning engine 112 constructs the workflow as described below with reference to FIG. 5.

Figure 5:
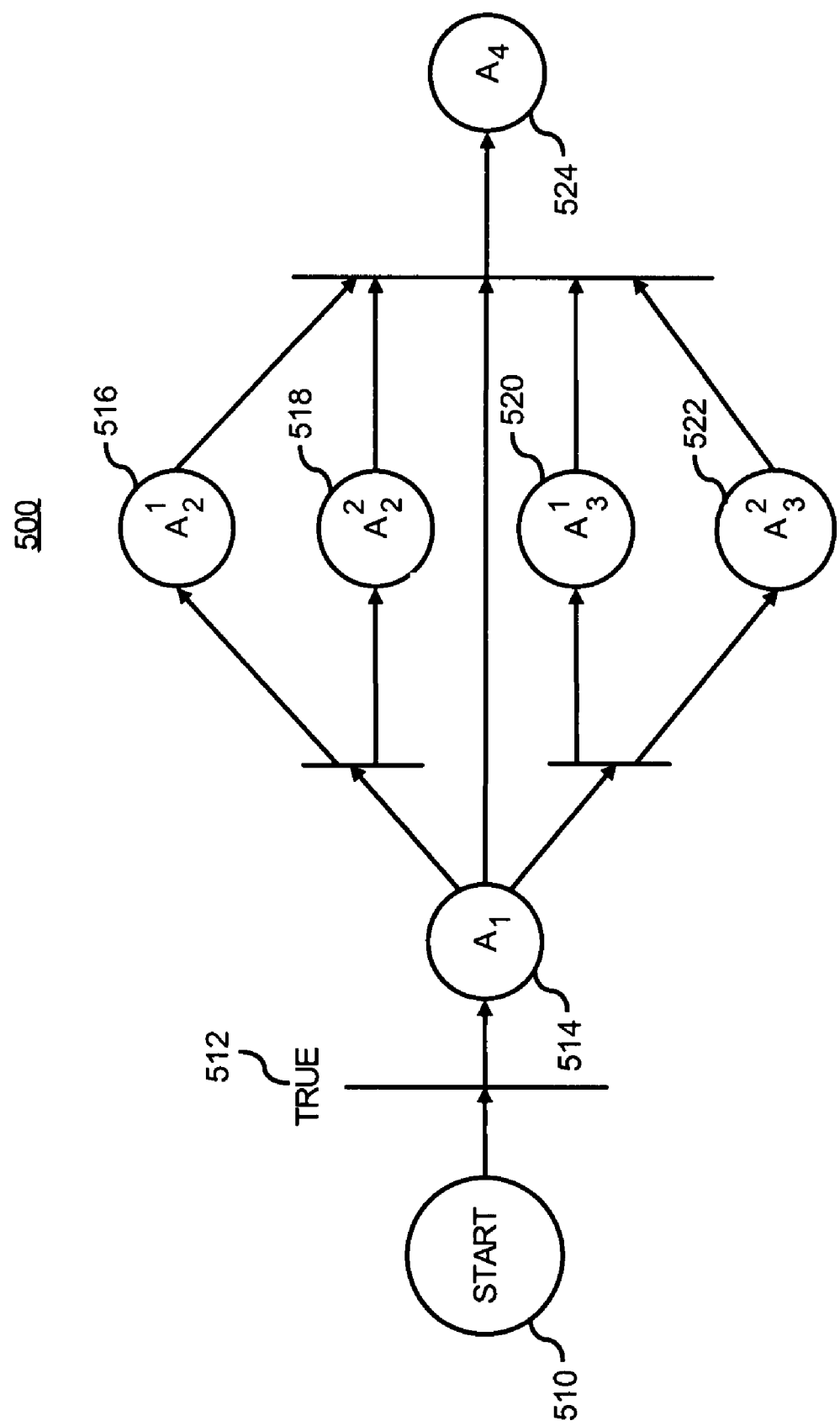
FIG. 5 illustrates a workflow for automated change management, in accordance with one embodiment.

The workflow is constructed by analyzing each pair of actions to determine if one enables the other. The current system state can be represented as a set of propositions and pre-conditions of certain actions may be satisfied by it. These actions are independent of other triggered rules and can be executed as the first set of actions in the workflow. These actions are called trivially-enabled actions. Thus, an action a is said to be trivially-enabled if the current state of the system, I, satisfies its pre-condition. Formally, it is represented as I⊨pre(a), where ⊨ is the satisfies symbol. The reasoning engine 112 first executes a trivial-enablement analysis to initialize the Petri net by assigning a place to each action and creating a transition with the Boolean function true. This transition is connected to a Start place, which is the beginning or start of the workflow to be generated. The first algorithm evaluates the pre-condition of each action to determine if it is true and marks the action as trivially-enabled if so. These trivially-enabled actions are connected by edges from the true transition. FIG. 5 illustrates a workflow 500, wherein an action $A_1$ (514) is trivially-enabled because of its pre-condition. Thus, $A_1$ is connected by an edge from the true transition (512), which is connected to the Start (510) of the workflow 500.

Once trivially-enabled actions have been identified, the next check is to see which action enables which other actions through enablement analysis, wherein an action $a_1$ is said to enable action $a_2$ if post($a_1$)⊨pre($a_2$) where post($a_1$) represents the post-condition of action $a_1$, and $a_2$ is not trivially-enabled. This implies that an execution of $a_1$ satisfies the pre-condition of $a_2$, and so $a_2$ can be executed after $a_1$. Because any proposition satisfies the true proposition, there is no check to see if post-condition of an action satisfies pre-condition of a trivially-enabled action. Accordingly, the enablement analysis verifies for each triggered action if its post-condition satisfies the pre-condition of a non-trivially-enabled action. It does a pair-wise satisfiability check of actions to determine enablement. It starts out with a set of Enable(a), which contains all actions that are enabled by action a. The enablement analysis iterates through each action a and if a enables other actions, it connects them to a through transitions labeled with their pre-conditions. FIG. 5 illustrates the workflow 500, wherein two instances of the action $A_2$ ($A_2^1$ and $A_2^2$, or 516 and 518) and two instances of the action $A_3$ ($A_3^1$ and $A_3^2$, or 520 and 522) are triggered and enabled by the action $A_1$.

Post-conditions of some actions may satisfy part of the pre-condition of another action through a partially-enablement analysis. That is, an action $a_1$ is said to partially-enable action $a_2$ if post($a_1$)⊨partial-pre($a_2$), where partial-pre($a_2$) is a conjunction of some proper subset of conjuncts of pre($a_2$). A set of partially-enabling actions of an action a that together enable a is called a partial-set of a. An action may have multiple partial-sets and therefore, the set of all partial-sets of a is denoted by partial-sets(a). As illustrated in FIG. 5, partial-sets($A_4$)={$A_2^1$, $A_2^2$, $A_3^1$, $A_3^2$}. Accordingly, the partially-enablement analysis determines for every action a that is not trivially-enabled, which set of actions collectively enable a. If a set of actions that collectively enables a contains only one action, then such a set implies that a single action enables a and therefore is already determined by the aforementioned enablement analysis. Therefore, a partially-enablement analysis only considers sets having more than one element. In addition, such an analysis does not test an action with itself for partial-enablement as this might lead to a deadlock. Though the partial-enablement analysis can replace enablement analysis, these two are separated because partial-enablement analysis has a much higher complexity. Once the partial-sets are determined, the reasoning engine 112 completes the workflow construction by adding transitions.

Once dependencies among triggered rule actions have been determined, the enforcement semantics of the reasoning engine 112 specifies the execution order of actions. In one embodiment, the reasoning engine 112 employs the maximum-rule enforcement semantics, which guarantee that the reasoning engine 112 enforces rules in an order that ensures as many rules are successfully enforced as possible, provided no other errors cause rule enforcement to fail. If any place in the workflow can be reached from the Start place, it will be executed. If a place cannot be reached, the workflow is not discarded. Whether a place is reachable from the Start place may be determined by any reachability algorithm, such as one described in W. Reisig, "Petri Nets: An Introduction," Springer-Verlag, New York, 1985.

The order of execution of rule action depends on the enforcement semantics used in the system 100. Thus, the maximum-rule enforcement semantics use Petri net based traversal algorithms to traverse the workflow and execute actions. A workflow execution engine analyzes the Petri net for any deadlocks using any known deadlock detection algorithm, such as one described by the aforementioned W. Reisig. If a deadlock is found the actuators module 130 does not execute any action in the workflow. In one embodiment, if the Petri net is deadlock-free, the engine uses a simple Petri net traversal algorithm based on Breadth-First Search (BFS) to traverse the net and execute actions. The transition states of the Petri net act as synchronization points in the workflow. When multiple places lead to a single transition, the actuators module 130 waits for the completion of all actions in the places before executing actions of places leading out of the transition. At each transition, the engine verifies the Boolean function for satisfaction before executing the following action. For example, referring to FIG. 5, action $A_1$ is executed, followed by concurrent execution of actions $A_2$ and $A_3$ and then action $A_4$ is executed.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing change management in a distributed system comprising:

compiling a policy for change management in the distributed system, the policy includes at least one policy rule based on an event-condition-action (ECA) framework with a pre-condition and a post-condition to an action in the policy rule, wherein the pre-condition is separate from a condition of the policy rule and indicates a prior condition in the distributed system that enables the action, and the post-condition indicates a subsequent condition in the distributed system that results from the action;

receiving at least one event indicating a change in the distributed system;

determining that the at least one received event triggers the at least one policy rule;

generating, by a computer, a workflow to manage the change in the distributed system based on the at least one triggered policy rule, wherein the at least one policy rule includes at least two policy rules, and generating the workflow includes determining whether one of the at least two policy rules includes an action therein with a pre-condition that is partially satisfied by a post-condition of an action in another one of the at least two policy rules; and initiating one or more actuators in the distributed system to dynamically configure or deploy components in the distributed system to execute the workflow, wherein determining that the at least one received event triggers the at least one policy rule comprises determining that the at least one received event triggers the at least two policy rules, and wherein generating a workflow to manage the change in the distributed system comprises:
identifying dependencies among the actions in the at least two triggered policy rules; and
performing enforcement semantics to specify an execution order of the actions in the at least two triggered policy rules based on the identified dependencies, wherein the enforcement semantics specify that all reachable rules in the workflow are enforced for execution, and if a rule to be executed cannot be reached the workflow is not discarded.

2. The method of claim 1, wherein receiving at least one event comprises:
receiving at least one event in each of a plurality of predetermined time periods, wherein the at least one event received in the each predetermined time period indicates a change in the distributed system.

3. The method of claim 1, further comprising:
resolving any conflict between the at least two triggered policy rules to prioritize the at least two triggered policy rules.

4. The method of claim 3, wherein generating the workflow comprises:
generating the workflow to manage the change in the distributed system based on the at least two triggered policy rules and their priorities from the resolved conflict.

5. The method of claim 1, wherein generating the workflow comprises:
determining whether the at least two triggered policy rules include actions therein with any of their pre-conditions satisfied by a current state of the distributed system.

6. The method of claim 1, wherein generating the workflow comprises:
determining whether each of the at least two triggered policy rules includes an action therein with a pre-condition that is fully satisfied by a post-condition of an action in another one of the at least two policy rules.

7. A system framework for providing change management in a distributed system comprising:
an adaptation engine module operable to compile a policy for change management in the distributed system and to store at least one rule of the policy based on an event-condition-action (ECA) framework with a pre-condition and a post-condition to an action in the policy rule,
wherein the pre-condition is separate from a condition of the policy rule and indicates a prior condition in the distributed system that enables the action, and the post-condition indicates a subsequent condition in the distributed system that results from the action,
wherein the adaptation engine further comprises a rule processor module operable to evaluate the compiled policy and to determine that the at least one event received by the event receiving module triggers the at least one policy rule;
a reasoning engine module operable to generate a workflow to manage the change in the distributed system based on the at least one triggered policy rule,
wherein the at least one policy rule includes a plurality of policy rules, and the rule processor module is operable to evaluate the compiled policy to determine that the at least one event received by the event receiving module triggers the plurality of policy rules, and
the reasoning engine is further operable to determine whether each of the plurality of policy rules includes an action therein with a pre-condition that is partially satisfied by a post-condition of any action in another one of the plurality of policy rules;
an event receiving module operable to receive at least one event indicating a change in the distributed system; and
an execution module operable to dynamically configure or deploy components in the distributed system to manage the change in the distributed system,
wherein the reasoning engine is operable to implement enforcement semantics to specify an execution order of the actions in the plurality of triggered policy rules based at least on a specification that all reachable rules in the workflow are enforced for execution, and if a rule to be executed cannot be reached the workflow is not discarded.

8. The system framework of claim 7, wherein the adaptation engine module comprises:
a policy store module operable to store the compiled policy and the at least one policy rule having its action annotated with the pre-condition and post-condition.

9. The system framework of claim 7, wherein the reasoning engine module is further operable to resolve any conflict among the at least one triggered policy rule so as to orchestrate at least one action in the at least one triggered policy rule into the workflow.

10. The system framework of claim 7, wherein the at least one event comprises a plurality of events, and the event receiving module is operable to receive the plurality of events in a predetermined time period to indicate the change in the distributed system.

11. The system framework of claim 7, wherein the reasoning engine module is operable to perform:
a determination of whether the at least two triggered policy rules include actions therein with any of their pre-conditions satisfied by a current state of the distributed system; and
a determination of whether each of the at least two triggered policy rules includes an action therein with a pre-condition that is fully satisfied by a post-condition of an action in another one of the at least two policy rules.

12. A computer readable medium on which is encoded computer executable programming code that includes computer execution instructions to:
compile a policy for change management in the distributed system, the policy includes at least one policy rule based on an event-condition-action (ECA) framework with a pre-condition and a post-condition to an action in the policy rule, wherein the pre-condition is separate from a condition of the policy rule and indicates a prior condition in the distributed system that enables the action, and the post-condition indicates a subsequent condition in the distributed system that results from the action;
receive at least one event indicating a change in the distributed system;
determine that the at least one received event triggers the at least one policy rule;
generate a workflow to manage the change in the distributed system based on the at least one triggered policy rule,
wherein the at least one policy rule includes at least two policy rules that are triggered, and generating the workflow includes determining whether one of the at least two policy rules includes an action therein with a pre-condition that is partially satisfied by a post-condition of an action in another one of the at least two policy rules; and initiate one or more actuators in the distributed system to dynamically configure or deploy components in the distributed system to execute the workflow, wherein determining that the at least one received event triggers the at least one policy rule comprises determining that the at least one received event triggers the at least two policy rules, and wherein generating a workflow to manage the change in the distributed system comprises:

identifying dependencies among the actions in the at least two triggered policy rules; and performing enforcement semantics to specify an execution order of the actions in the at least two triggered policy rules based on the identified dependencies, wherein the enforcement semantics specify that all reachable rules in the workflow are enforced for execution, and if a rule to be executed cannot be reached the workflow is not discarded.

13. The computer readable medium of claim 12, wherein the encoded computer executable programming code further includes computer execution instructions to:

resolve any conflict between the at least two triggered policy rules to prioritize the at least two triggered policy rules.

* * * * *